United States Patent

Pascal et al.

[11] Patent Number: 5,343,695
[45] Date of Patent: Sep. 6, 1994

[54] COMBINED JET ENGINE PROVIDED WITH MEANS FOR SWITCHING BETWEEN TWO OPERATING STATES

[75] Inventors: Noël B. Pascal, Lieusaint; Georges Mazeaud, Yerres; Claude W. Pascal, Savigny Le Temple, all of France

[73] Assignee: Societe Nationale d'Etude Et de Construction de Moteurs d'Aviation "SNECMA", Paris, France

[21] Appl. No.: 75,879

[22] Filed: Jun. 14, 1993

[30] Foreign Application Priority Data

Jun. 24, 1992 [FR] France ................ 9207712

[51] Int. Cl.⁵ .................................... F02K 9/00
[52] U.S. Cl. .................... 60/225; 60/270.1
[58] Field of Search ........... 60/224, 225, 244, 270.1, 60/226.3

[56] References Cited

U.S. PATENT DOCUMENTS

| | | |
|---|---|---|
| 3,016,694 | 1/1962 | Howarth et al. . |
| 4,919,364 | 4/1990 | John et al. ................ 60/225 |
| 5,058,378 | 10/1991 | Enderle ................... 60/225 |

FOREIGN PATENT DOCUMENTS

| | | |
|---|---|---|
| 0358347 | 3/1990 | European Pat. Off. . |
| 2917303 | 10/1980 | Fed. Rep. of Germany . |
| 2653177 | 4/1991 | France . |
| 2027813 | 2/1980 | United Kingdom . |

Primary Examiner—Richard A. Bertsch
Assistant Examiner—William Wicker
Attorney, Agent, or Firm—Oblon, Spivak, McClelland, Maier & Neustadt

[57] ABSTRACT

A jet engine has a central turbojet stream and a peripheral ram jet stream which can be in turn obstructed or freed by flaps. The flaps can be opened outwardly and are located on an intake cone and at an inlet of the peripheral stream. The operation of the flaps is a function of the sought operating mode. This arrangement permits a very good guidance of gases.

3 Claims, 2 Drawing Sheets

COMBINED JET ENGINE PROVIDED WITH MEANS FOR SWITCHING BETWEEN TWO OPERATING STATES

BACKGROUND OF THE INVENTION

Field of the Invention

The invention relates to a combined jet engine provided with means for switching between two operating states such as a turbojet operation and a ram jet operation.

Turbojet operation is preferred up to an aircraft speed roughly four times the speed of sound (Mach 4), but it is necessary to pass into the ram jet mode for obtaining even higher speeds (up to Mach 7 or 8). As the air then reaches a very high temperature, it must be made to skirt the gas turbine mainly forming the turbojet and it is for this purpose that the jet engine stream is subdivided over part of its length between a central turbojet stream where the turbine is located and a peripheral stream surrounding the latter and where the ram jet burners are located. However, it is necessary to provide means for obstructing one or the other of the two streams in order to guide all the air into the stream associated with the chosen operation mode.

DISCUSSION OF THE RELATED ART

The prior art has generally used a cone located in the center of the central stream which is mobile in a translational manner along the jet engine axis. The central stream is obstructed if it is constructed with a narrow intake with the cone touching its contour when advanced. A flat system is used for obstructing or freeing the peripheral stream.

SUMMARY OF THE INVENTION

The invention relates to an improvement to such devices and has in particular the advantages of allowing a better air guidance in the chosen stream in both operating modes, without the obstruction means impeding the flow in the open stream.

The jet engine consequently comprises obstruction means constituted by internal flaps articulated in the center of the central stream and external flaps articulated between the central stream and the peripheral stream, the internal flaps having a substantially axial orientation in a first jet engine operating mode such as the turbojet mode, the external flaps then obstructing the peripheral stream, such that it is possible to rotate and open outwardly the internal and external flaps in such a way as to make them meet by ends opposite to their articulated joints and assume a common cone arrangement obstructing the central stream and deflecting the gases towards the peripheral stream in the other operating mode such as the ram jet mode.

Internal flap systems opening out in a manner identical to the invention already exist for the purpose of restricting the flow of air into aircraft engines, but not in combination with external flaps positioned around them so that all the flaps cooperate in order to obstruct the central stream and guide the gases toward the peripheral stream during the second mode.

It is advantageous for the internal flaps to be constituted by concentric layers articulated to one another between the articulated joint and an actuating means, an abutment device between the parts being provided in order to limit their angular movements. These devices can consist of rods provided with clearance links between the consecutive articulated parts. The advantage of such a design is that the curvature of the internal flaps differs in the two modes in order to optimize the air guidance in both areas.

BRIEF DESCRIPTION OF THE DRAWINGS

The invention is described in greater detail hereinafter relative to a non-limitative embodiment and with respect to the attached drawings, wherein.

DETAILED DESCRIPTION OF THE PREFERRED EMBODIMENT

Figure 1:
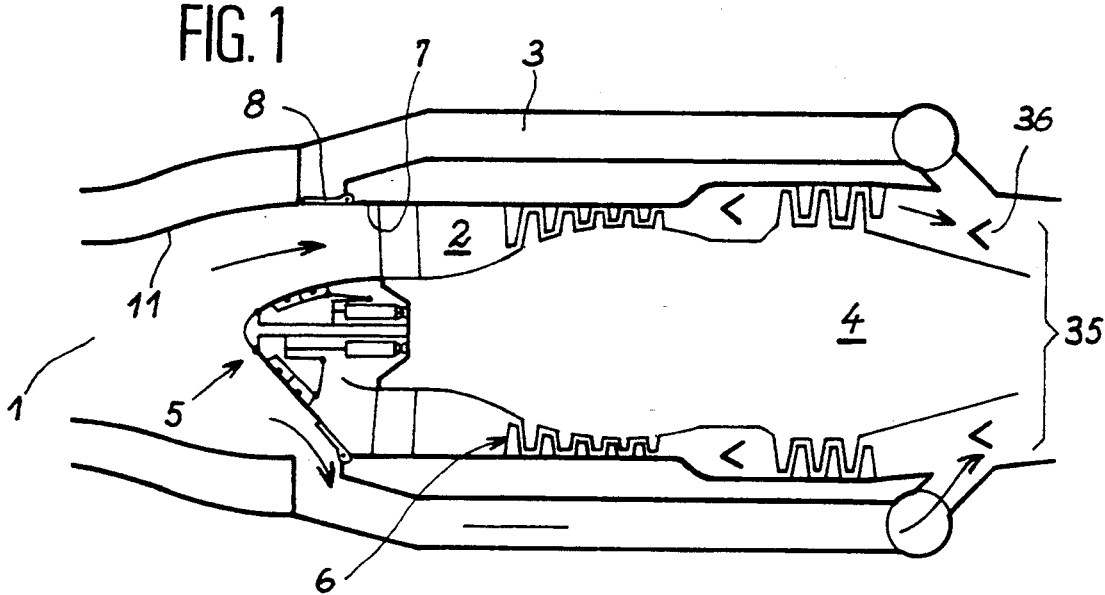
FIG. 1 illustrates a general view of the jet engine.

The jet engine of FIG. 1 comprises an air intake duct 1, which is then subdivided so as to form a central stream 2 and a peripheral stream 3 concentric to the stream 2. The central stream 2 protects a gas turbine 4 which constitutes the essential element of the turbojet and the peripheral stream 3 skirts the gas turbine 4 and only joins the central stream 2 again at the gas discharge pipe 35. At this location it is equipped with burners 36.

The gas turbine 4 has an intake cone 5 in the center in the direction of the duct 1. The air skirts the intake cone 5 before being directed towards the compressor blades 6. The central stream 2 is externally limited by a circular wall 7 which is extended in turbojet operation by external flaps 8 oriented in an axial direction and together form a cylinder. They then close the inlet of the peripheral stream 3 touching with their free end 9, opposite to an articulated joint 10 on the edge of the circular wall 7, the external wall 11 defining the air intake duct 1.

Figure 3:
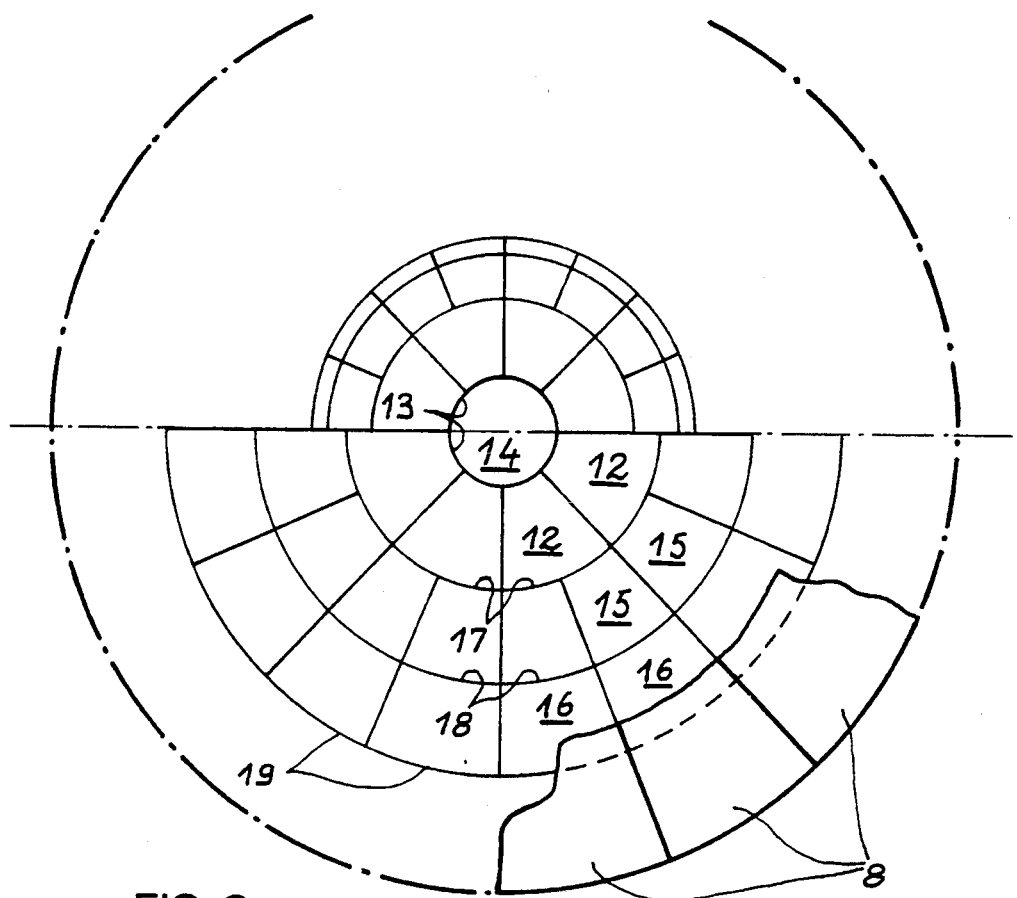
FIG. 3 illustrates a view of the flaps but in the jet engine axis direction.
Figure 2:
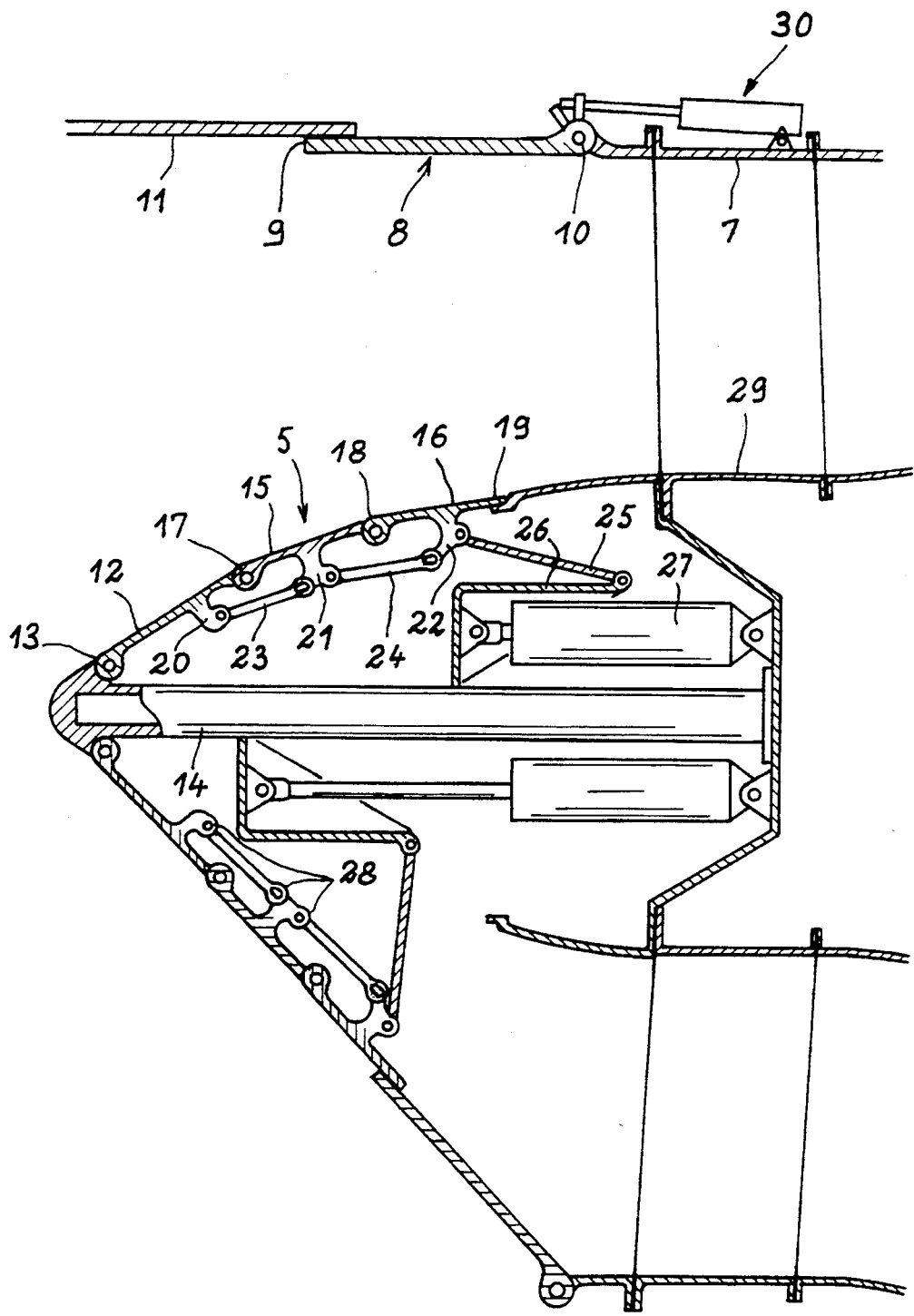
FIG. 2 illustrates a view of the obstruction flaps.

The air intake cone 5 is essentially constituted by internal flaps (cf. FIGS. 2 and 3), whereof it is possible to see three successive, concentric layers, namely top flaps 12 connected by articulated joints 13 to the end of a fixed central shaft 14 and connected to the gas turbine 4, intermediate flaps 15 and base flaps 16. Articulated joints 17 link one of the ends of the intermediate flaps 15 to the ends of the top flaps 12, which are opposite to the articulated joints 13, while articulated joints 18 link one end of the base flap 16 (the opposite end 19 thereof being free) to the ends of the intermediate flaps 15 opposite to the articulated joints 13. The internal flaps 12, 15 and 16 carry handle supports, respectively 20, 21 and 22 on their face oriented towards the shaft 14. Rods 23, 24, 25 are respectively articulated on the handles of supports 20, 21, on the handles of supports 21, 22 and the handles of supports 22 and shelves 26 joined to the jack rod 27 parallel to the shaft 14, located immediately around it and whose cylinder is connected to the gas turbine 4. The rods 23, 24 are provided with shackles 28, whose hole has a wide clearance with respect to the engaged handle. As a result the internal flaps 12, 15, 16 can rotate with respect to one another within the angular limits defined by the clearances of the rods 23, 24. There are two abutment positions and in the one illustrated in the upper half of FIGS. 1 and 2 the jacks 27 have their rod retracted and the internal flaps 12, 15 and 16 form a surface, whose substantially conical shape tapers with an ever more marked axial orientation to become roughly cylindrical towards the rear, where the end 19 is connected to the wall 29 which defines from the inside the central stream 3 by virtually extending it. In this position, the external flaps 8 which extend the circular wall 7, are connected to the external wall 11 and close the inlet of the peripheral stream 3. The air is easily guided in the central stream 2 due to the absence of angles and sudden section modifications on passing between the duct 1 and the stream 2. In the other position, illustrated in the lower half of FIGS. 1 and 2, the jacks 27 are extended, which moves apart the internal flaps 12, 15 and 16 and forms a more squat cone and whose generatrixes are straight, unlike in the preceding case. Jacks 30 external of the circular wall 7 have also been opened out in order to make the external flaps 8 rotate about the articulated joints 10 in such a way that their free ends 9 touch the free ends 19 of the base flaps 16. All the flaps then form a common cone extending from the reactor axis up to the circular wall 7. The air coming from the duct 1 is then easily propelled towards the peripheral stream 3, whose inlet exactly surrounds the base of the thus formed cone.

We claim:

1. A jet engine having a gas circulation stream subdivided over part of its length into a central stream and a peripheral stream, the jet engine incorporating internal flaps which are mobile about internal articulated joints located at a center of an inlet of the central stream and external flaps which are mobile about external articulated joints located in an area between the central stream and the peripheral stream, the internal flaps having a substantially axial orientation in a first operating mode where the central stream is open and a conical orientation in a second operating mode where the central stream is obstructed, wherein the external flaps are positioned in front of an inlet of the peripheral stream and are mobile in such a way that the external flaps obstruct the inlet of the peripheral stream during the first operating mode and assume a conical orientation during the second operating mode by meeting at an end opposite to the external articulated joints with an end of the internal flaps opposite to the internal articulated joints, the internal and external flaps then forming a substantially conical common surface, which deflects gases towards the peripheral stream and obstructs the central stream.

2. A jet engine according to claim 1, wherein the internal flaps are constituted by articulated concentric layers between the internal articulated joints and an actuating means, abutment devices between the layers being provided in order to limit their angular movements.

3. A jet engine according to claim 2, wherein the abutment devices are constituted by rods provided with clearance links between consecutive articulated parts.

* * * * *

UNITED STATES PATENT AND TRADEMARK OFFICE
CERTIFICATE OF CORRECTION

PATENT NO. : 5,343,695
DATED : September 6, 1994
INVENTOR(S) : Pascal N. BROSSIER, et al.

It is certified that error appears in the above-indentified patent and that said Letters Patent is hereby corrected as shown below:

On the title page, Item [19], the first inventor's name should read:   --BROSSIER et al.--

Also on the title page, Item[75], the names of the first and third inventors are listed incorrectly. It should read:

--Pascal N. BROSSIER, Lieusaint; Georges MAZEAUD, Yerres; Pascal C. WURNIESKY, Savigny Le Temple, all of France--

Signed and Sealed this

Sixth Day of December, 1994

Attest:

BRUCE LEHMAN

Attesting Officer          Commissioner of Patents and Trademarks